Sept. 8, 1931.   J. W. SCHADE   1,822,240
METHOD AND APPARATUS FOR LINING PIPES
Filed Jan. 31, 1930
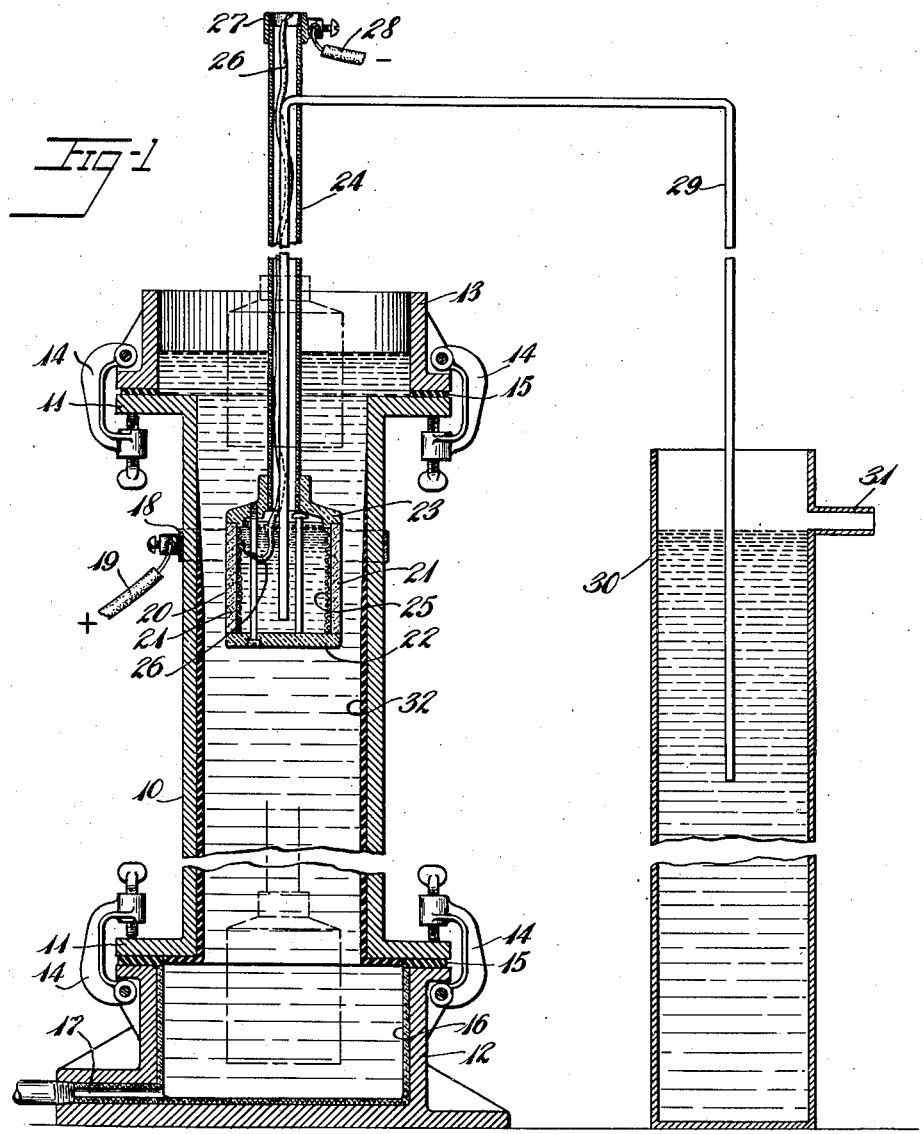
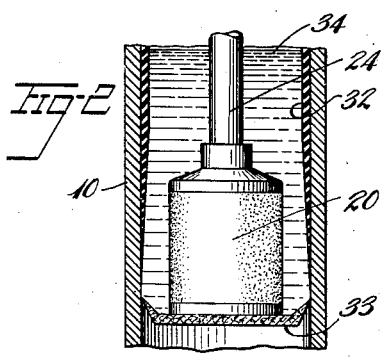
Inventor
James W. Schade
By Eakin & Avery
Attys.

Patented Sept. 8, 1931

1,822,240

UNITED STATES PATENT OFFICE

JAMES W. SCHADE, OF AKRON, OHIO, ASSIGNOR TO AMERICAN ANODE, INC., OF AKRON, OHIO, A CORPORATION OF DELAWARE

METHOD AND APPARATUS FOR LINING PIPES

Application filed January 31, 1930. Serial No. 424,897.

This invention relates to the art of rubber manufacture, and particularly to the application of rubber linings to cylindrical structures such as pipes.

Rubber coatings have heretofore been applied to metal articles by various methods, including the electrodeposition of the rubber from aqueous dispersions such as latex. All of these methods present substantial difficulties when they are applied to the lining of pipes, the interior of which is comparatively inaccessible and does not admit of the entry and employment of bulky tools or of tools which must be manipulated by hand. The electrodeposition process exhibits numerous peculiar advantages such as the possibility of forming smooth, uniform coatings of the highest quality of rubber, that is, unmasticated rubber derived directly from latex, the elimination of the mechanical mixing and mastication and all the heavy, expensive machinery incident to these operations, the ease with which the process may be regulated, etc. However, it suffers from the difficulties and disadvantages mentioned above, as well as from the fact that during electrodeposition considerable volumes of hydrogen are evolved at the cathode, forming a copious foam upon the surface of the liquid or even being entrapped within the deposit in the form of bubbles, rendering the deposit porous.

By the practice of this invention, however, pipes or other cylindrical structures of all except the very smallest sizes may readily be lined with rubber in such a manner as to make the advantages of the electrodeposition process fully apparent and available, while the disadvantages mentioned above are entirely obviated. In addition, this invention permits the lining of even very large or extremely long pipes with a minimum depositing current, and in its preferred embodiment maintains the concentration of the latex substantially constant during the deposition.

A preferred type of apparatus for carrying out this invention is illustrated in the accompanying drawings, Fig. 1 being a somewhat diagrammatic sectional view, and Fig. 2 being a detail of a modified form of the apparatus.

In Fig. 1 a section of flanged pipe 10 is temporarily clamped by its flanges 11, 11 to a hollow pedestal 12 and an extension 13, each of which is provided with clamps 14, 14 for that purpose. Gaskets 15, 15 of rubber or other resilient insulating material seal the joints between the pipe and the pedestal and extension, the clamps 14 preferably also being made of insulating material or being provided with insulating bushings so that the pedestal and extension are electrically isolated from the pipe 10. Alternatively, the pedestal and extension may be provided with an insulating lining 16, say of rubber, as is indicated in the pedestal 12. The pedestal 12 is provided with an opening 17 through which latex is supplied from a tank (not shown) and through which it is again drained after the pipe is lined with rubber. The pedestal 12 and extension 13 as shown have a considerably greater diameter than the pipe 10, so that the lining as it is formed extends over at least a portion of the flanges 11, 11 and acts as a gasket when two or more sections of the finished rubber-lined pipe are bolted together.

The pipe 10 serves as the anode of the electrodeposition cell, being connected, for example by a band 18, clamped around the pipe, to the positive cable 19 of a source of direct current (not shown) at about 50 volts. The cathode is contained within a plunger 20, of such diameter as to be moved readily from one end of the pipe to the other without coming in contact with the lining.

The plunger 20 consists essentially of a cylindrical porous diaphragm 21 of porous porcelain, asbestos, or the like, securely clamped in water-tight relationship with a lower plate 22 and an upper head 23. The head 23 in turn is fastened to a tube 24 which gives the interior of the plunger free communication with the atmosphere, while at the same time serving as a support. The plate 22, the head 23, and the tube 24 are preferably all made of an insulating material, although they may be merely coated with an insulating layer. The cathode proper is placed within the plunger 20, preferably in fairly close relationship with the diaphragm 21.

In the drawings the cathode 25 is shown as a cylinder of woven wire in close contact with the diaphragm, being joined by a connecting cable 26 and collar 27 to the negative cable 28 of the source of current. This construction of cathode presents a large surface to the cathodic liquid, and at the same time permits the ready escape of any gases which are generated, the gases escaping to the atmosphere through the tube 24. A small siphon tube 29 penetrates through the tube 24 into the plunger 20, the other end of the siphon tube dipping into a well 30, provided with an overflow pipe 31, preferably at a slightly lower level than the level of the latex in the extension 13 of the pipe 10.

In the operation of the apparatus, latex, which may contain vulcanizing agents, accelerators, fillers, etc. intimately admixed therewith in a finely dispersed condition, and preferably somewhat more concentrated than it occurs in nature, is introduced into the pedestal 12, pipe 10, and extension 13 through the opening 17 until it fills the extension 13 nearly to the top, care being taken to eliminate all entrapped air bubbles which may adhere to the pipe 10 or its flanges 11, 11. The plunger 20 is lowered to the position within the pedestal 12 shown in broken lines and a current of from 0.1 to 0.5 amperes per square inch of surface of the diaphragm is passed between the pipe 10 and the cathode 25. During the passage of the current the plunger is slowly raised until it reaches the position within the extension 13 indicated by broken lines, at which time the electrical circuit is broken. The level of the latex may be maintained constant by the introduction of fresh liquid through the opening 17.

The current flowing between the pipe and the cathode has three major effects. The first and most important is that the negatively charged particles of rubber (or other added substances) under the influence of the current wander toward the pipe (the anode) where they are coagulated as a coherent deposit 32 of rubber. The deposit is progressively formed opposite the plunger as it advances through the pipe from one end to the other, the rate of deposition and consequently the thickness of the deposit being absolutely uniform over the entire length of the pipe. The deposit has a somewhat spongy structure and still contains considerable proportions of water, but its water content is considerably lower than that of the latex, and upon drying it becomes compact and almost completely impervious to water or corrosive solutions.

Inasmuch as the deposited coating contains a greater proportion of rubber than the latex, it is evident that the latex would become progressively more and more dilute if some of the water or serum were not also removed. This is the second effect of the current. The diaphragm 21 functions as an electro-endosmotic diaphragm. That is, there is a tendency for the watery fluid in the pores of the diaphragm to flow toward the cathode. If the pores of the diaphragm are too fine its electrical resistance is too high, whereas if they are too coarse the flow of the latex serum will depend upon comparatively slight differences of external pressure rather than upon the electro-endosmosis. When the diaphragm is properly chosen a substantial flow of serum takes place, tending to maintain the concentration of the latex at a constant value. An exact balance may be attained by adjusting the original concentration of the latex. The siphon tube 29 provides a means of egress for the serum without putting an undue pressure upon the diaphragm 21. The pressure within the plunger is maintained slightly lower than that outside by the expedient of placing the overflow pipe 31 slightly lower than the level of the latex in the extension 13 of the pipe 10. This slight difference in pressure assists in the removal of the serum from the latex and assures the somewhat fragile material of the diaphragm 21 being under compressive stress rather than under tensile stress.

The third effect of the current is the evolution of gas at the cathode. The gas bubbles, being unable to penetrate the fine pores of the diaphragm 21, escape to the atmosphere through the tube 24.

After the pipe is completely lined the plunger is withdrawn, the latex is returned to the storage tank, the pipe 10 is disconnected from the extension 13 and pedestal 12 and placed in a drier. After the rubber is dry it may be vulcanized in any convenient manner, for example, in steam under pressure.

In the alternative modification shown in Fig. 2, which is particularly adapted to very long pipes, a gasket or washer 33 of resilient material such as rubber is fastened to the bottom of the plunger 20. A small quantity of latex is then poured over and around the plunger, filling the pipe to the level 34 somewhat above the plunger. The washer serves to support the liquid and prevent it from leaking through below the plunger. The current is then passed between the pipe 10 and the cathode within the plunger 20 at the same time that the plunger is lowered in the pipe. As the plunger is lowered the washer exposes the pipe 10 progressively to the latex and hence to the action of the current, the rubber being deposited on the pipe from the latex in a uniform layer, the level 34 of the latex following the plunger as it progresses down the pipe. In this embodiment only a small quantity of latex is required, although the total capacity of the pipe may be very great.

It is to be understood that the term "latex", as herein employed, is intended to include natural latices of caoutchouc, gutta-percha, balata, etc., as well as artificial latices or aqueous emulsions of caoutchouc, gutta-percha, balata, reclaimed rubber, synthetic rubber, rubber isomers and like products, whether or not admixed with vulcanizing agents, pigments, fillers, softeners, etc., or previously purified, concentrated, vulcanized or otherwise treated.

Although certain specific embodiments of this invention have been described above, it is not intended thereby to limit its scope, but to limit it only as indicated in the appended claims and as required by the prior art.

I claim:

1. The method of lining pipes with rubber by electrodeposition which comprises passing an electric current through a liquid latex between the pipe and a cathode contained within a porous diaphragm within the pipe, while the cathode moves continuously along the axis of the pipe.

2. An apparatus for lining a cylindrical object with rubber by electrodeposition comprising means for maintaining a supply of latex within the said object, and a cylindrical electrode movable within the said object along its axis, and means for preventing gases evolved at the cathode from escaping into the main body of the latex.

3. An apparatus for lining a cylindrical object with rubber by electrodeposition comprising means for maintaining a supply of latex within the said object, and a cathode contained within a porous diaphragm and movable along the axis of the said cylinder.

4. An apparatus for lining a cylindrical object with rubber by electrodeposition comprising means for maintaining a supply of latex within the said object, a cathode contained within a porous diaphragm and movable along the axis of the said cylinder, and means for the escape of gases and liquids from within the diaphragm.

5. An apparatus for lining a pipe with rubber by electrodeposition comprising extensions adapted to be clamped temporarily to the two ends of the pipe, means for filling the pipe with latex, a cathode shorter than the pipe and contained within a cylindrical porous diaphragm and movable lengthwise of the pipe, and means for the escape of gases and liquids from within the diaphragm.

6. An apparatus for lining pipes with rubber by electrodeposition comprising extensions adapted to be clamped temporarily to the two ends of the pipe, means for filling the pipe with latex, a cathode only a fraction of the length of the pipe, contained within a cylindrical porous diaphragm and movable therewith lengthwise of the pipe, and a tube adapted to support the said cathode and diaphragm and serve as a means of escape of gases and liquids from within the diaphragm.

7. An apparatus for lining pipes with rubber by electrodeposition comprising means for maintaining a supply of latex within the pipe, a cathode shorter than the pipe, contained within a porous diaphragm and movable therewith lengthwise of the pipe, means for the escape of gas from within the diaphragm, and a tube adapted to maintain the fluid within the diaphragm at substantially the same pressure as that without the diaphragm.

8. An apparatus for lining pipes with rubber by electrodeposition comprising a cathode shorter than the pipe, contained within a porous diaphragm and movable therewith lengthwise of the pipe, means for the escape of fluids from within the diaphragm, and a resilient washer below the diaphragm, movable therewith and adapted to prevent the latex from flowing below the diaphragm.

In witness whereof I have hereunto set my hand this 28th day of January, 1930.

JAMES W. SCHADE.